United States Patent [19]

Fukushima et al.

[11] Patent Number: 4,617,804

[45] Date of Patent: Oct. 21, 1986

[54] REFRIGERANT FLOW CONTROL DEVICE

[75] Inventors: Toshihiko Fukushima, Ibaraki; Seigo Miyamoto, Katsuta; Kosaku Sayo, Katsuta; Kenji Emi, Katsuta, all of Japan

[73] Assignee: Hitachi, Ltd., Tokyo, Japan

[21] Appl. No.: 824,552

[22] Filed: Jan. 23, 1986

[30] Foreign Application Priority Data

Jan. 30, 1985 [JP] Japan ............... 60-14183

[51] Int. Cl.⁴ ............................. F25B 41/00
[52] U.S. Cl. ......................... 62/212; 62/225
[58] Field of Search ................... 62/225, 212

[56] References Cited

U.S. PATENT DOCUMENTS

| | | | |
|---|---|---|---|
| 4,499,739 | 2/1985 | Matsuoka et al. | 62/225 X |
| 4,505,125 | 3/1985 | Baglione | 62/209 |
| 4,523,435 | 6/1985 | Lord | 62/225 X |
| 4,571,951 | 2/1986 | Szymaszek | 62/225 X |

Primary Examiner—William E. Wayner
Attorney, Agent, or Firm—Antonelli, Terry & Wands

[57] ABSTRACT

In a refrigeration cycle in which the opening of the expansion valve is controlled by the super-heat degree of the refrigerant periodically detected at the outlet of the evaporator, a negative control signal is produced to rapidly change the opening of the expansion valve when the detected super-heat degree has reached zero. As a result, occurrence of the liquid back is prevented.

6 Claims, 10 Drawing Figures

REFRIGERANT FLOW CONTROL DEVICE

BACKGROUND OF THE INVENTION

The present invention relates to a refrigerant flow control device for used with a refrigerator cycle such as air conditioner and in particular to a refrigerant flow control device suitable to flow control when the liquid back state has occurred in the evaporator.

A conventional refrigerant flow control device in which the opening of the expansion value can be adjusted by an electrical signal will be first explained.

In order to evaporate the refrigerant in the evaporator moderately according to the external thermal load in the conventional refrigeration cycle, it is well known to provide temperature sensors at the inlet and the outlet of the evaporator, or to provide a temperature sensor and a pressure sensor at the outlet of the evaporator as described in U.S. Pat. No. 4,505,125 issued Mar. 19, 1985 in the name of Richard A. Baglione, and to obtain, on the basis of signals supplied from those sensors, the degree of super-heat of the refrigerant at the outlet of the evaporator and to control, by a refrigerant flow control device, the opening of the expansion valve thereby controlling the flow rate of the refrigerant in the refrigeration cycle, as to make the degree of super-heat a predetermined value.

In such a conventional refrigerant flow control device, the super-heat degree SH of the refrigerant measured at the outlet of the evaporator becomes zero and the deviation e of the measured super-heat degree SH from its desired value $SH_o$ is represented as $e = -SH_o$ when the refrigerant at the outlet of the evaporator assumes the two-phase state due to the decrease in the air flow rate of the cooling fan of the evaporator or the decrease in the thermal load within the room to be cooled. Even if the thermal load is then small or comparatively large near the saturated vapor line, the deviation signal e always assumes the constant value $SH_o$. Therefore, if the super-heat degree is decreased progressively to reach zero due to decrease in thermal load, for example, as illustrated in FIGS. 9 and 10, the deviation signal e assumes the constant value as represented by $e_o = -SH_o$ irrespective of the status position of the outlet of the evaporator. Thus, the opening of the expansion valve is disadvantageously adjusted based on the value of $e_o$ to control the refrigerant flow rate. Thus, even if the refrigerant flow rate should be rapidly decreased, the opening of the expansion valve would change slowly because of small absolute value of the deviation signal e. Accordingly, the refrigerant at the outlet of the evaporator will assume the two-phase state, namely so-called liquid back state for a long time, resulting in a drawback of shortened life or breakage of the compressor. Further, in a device for controlling the super-heat degree of the refrigerant at the outlet of the evaporator, the deviation e is always constant irrespective of the control signal supplied to the expansion valve. This results in a drawback of unstable control.

SUMMARY OF THE INVENTION

An object of the present invention is to provide, in order to resolve the above described problems, a refrigerant flow control device for used with a refrigeration cycle such as air conditioner in which when the two-phase state and liquid back state of the refrigerant occurs at the outlet of the evaporator, the opening of the expansion valve is rapidly changed to avoid the liquid back state and hence the refrigerant flow rate can be controlled according to the thermal load.

A refrigerant flow control device in accordance with the present invention, which is used with a refrigeration cycle composed of a compressor, a condenser, an expansion valve, the opening of which can be adjusted by an electrical signal, an evaporator, and refrigerant lines interconnecting them, comprises either a pair of temperature sensors or a combination of a pressure sensor and a temperature sensor provided to the evaporator, a control circuit for calculating the super-heat degree of the refrigerant at the outlet of the evaporator on the basis of the output signals supplied from the sensors and producing a suitable electrical signal based on the deviation between the measured super-heat degree and its set value for controlling the opening of the expansion valve so as to maintain the super-heat degree of the refrigerant at the preset value, and additionally, calculation control means for producing a negative control or compensation signal when the super-heat degree has reached zero, which is used to correct or make larger the deviation between the measured super-heat degree and the preset value thereby to rapidly change the opening of the expansion valve for preventing the liquid back state of the refrigerant.

The operation of the present invention is as follows:

If the thermal load of an air conditioner is decreased, the super-heat degree of the refrigerant at the outlet of the evaporator is lowered until it reaches zero. Even if the thermal load is further decreased, the super-heat degree remains zero. The ratio of the liquid phase in the refrigerant at the outlet of the evaporator, however, increases in proportion to decrease of the thermal load. Assuming that the decrease in thermal load is in porportion to the lapse of time in the vicinity of the point where the super-heat degree reaches zero because of decrease in thermal load, the ratio of the liquid phase of the refrigerant at the evaporator output also increases in proportion to the lapse of time. Assuming further that the rate in increase of the ratio of the liquid phase in the vicinity of zero super-heat point is in proportion to the rate in decrease of the super-heat degree immediately before the super-heat degree reaches zero, it is possible to evaluate the ratio of the liquid phase of the refrigerant after the super-heat has reached zero, which increases with decrease in the thermal load, by imaginarily extending the linear characteristic line representing variation of the positive super-heat degree as if the super-heat degree could change in the negative direction at the same rate as that in variation of the positive super-heat degree with respect to the lapse of time and determining a negative value of the super-heat degree from the extension of the linear characteristic line. Then, the opening of the expansion valve is rapidly controlled by a control signal dependent on increasing of the liquid phase of the refrigerant at the outlet of the evaporator so as to prevent occurrence of the liquid back state.

DESCRIPTION OF THE PREFERRED EMBODIMENTS

Embodiments of the present invention will now be described by referring to FIGS. 1 to 5.

Figure 1:
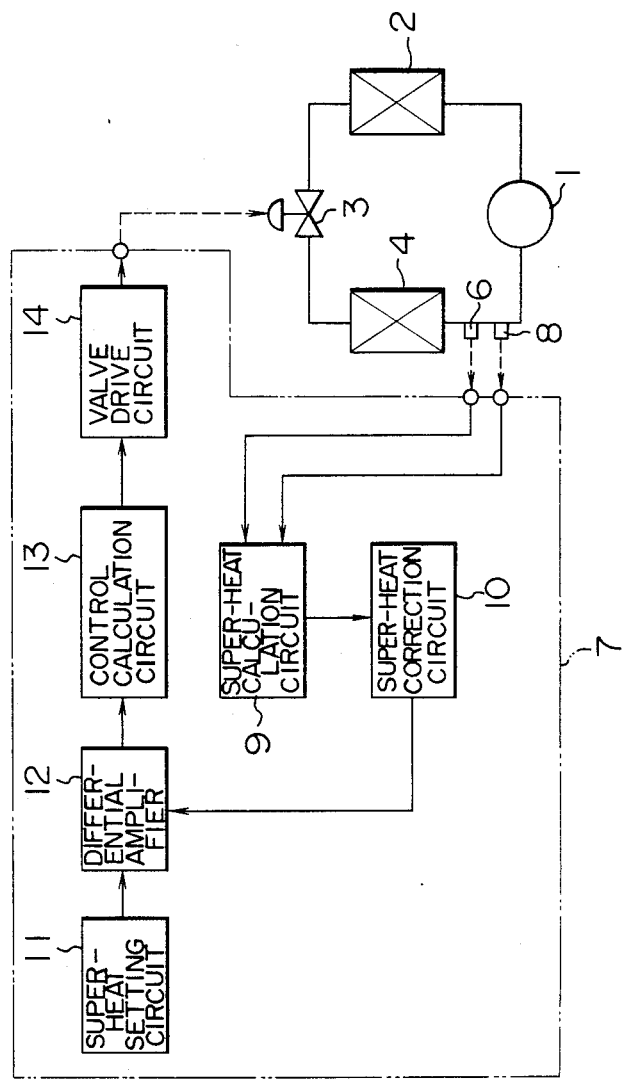
FIG. 1 shows the configuration of a refrigerant flow control device according to the present invention.

FIG. 1 shows the configuration of a refrigerant flow control device according to an embodiment of the present invention.

In FIG. 1, there are shown a compressor 1, a condenser 2, an expansion valve 3 the opening of which can be continuously adjusted by an electrical signal, and an evaporator 4. These components are interconnected through refrigerant lines to constitute a refrigeration cycle.

The refrigerant is compressed by the compressor 1 to be transformed to super-heated gas of high temperature and high pressure. The super-heated gas is then cooled and condensed by the condenser 2. The resultant liquid refrigerant of high pressure flows down at a flow rate controlled by the expansion valve 3. The liquid refrigerant is also subjected to adiabatic expansion to become low pressure and low temperature. The low pressure and low temperature liquid refrigerant is evaporated in an evaporator 4 while absorbing heat from the outside. The evaporated refrigerant gas again returns the compressor 1.

A refrigerant flow control device 7 is supplied with outputs of a temperature sensor 6 and a pressure sensor 8 which are disposed at the outlet of the evaporator 4. The refrigerant flow control device 7 controls the opening of the expansion valve 3. On the basis of the temperature signal supplied from the temperature sensor 6 and the pressure signal supplied from the pressure sensor 8, a super-heat calculation circuit 9 derives a super-heat signal representing the super-heat degree SH of the refrigerant at the outlet of the evaporator 4.

A super-heat correction circuit 10 produces a negative super-heat signal when the super-heat signal derived by the super-heat calculation circuit 9 is zero. A super-heat setting circuit 11 sets the control target or desired value of the super-heat degree. A differential amplifier 12 derives the deviation of the super-heat derived by the super-heat correction circuit from the desired super-heat value $SH_o$ preset by the super-heat setting circuit. On the basis of the deviation, a control calculation circuit 13 determines the necessary opening of the expansion valve 3. On the basis of the calculation result of the control calculation circuit 13, a valve drive circuit 14 produces an electrical signal for controlling the opening of the expansion valve 3.

In the normal operation state of the above described refrigeration cycle, the system operates so as to evaporate the refrigerant in the evaporator 4 at a rate suitable for the external thermal load. Therefore, the super-heat calculation circuit 9 obtains the super-heat degree SH of the refrigerant at the outlet of the evaporator 4 in a well-known manner on the basis of signals from the temperature sensor 6 and the pressure sensor 8. The obtained super-heat degree SH is not corrected in the super-heat correction circuit. The deviation between the super-heat degree SH and the target value $SH_o$ preset by the super-heat setting circuit 11 is derived by the differential amplifier 12. According to the deviation, the control calculation circuit 13 determines the size of opening of the expansion valve 3. A valve drive circuit 14 produces an electrical signal based on the determined opening size, which signal is supplied to an actuator (not shown) of the expansion valve 3 thereby adjusting the opening of the expansion so as to approach the determined size. Finally, the deviation between SH and $SH_o$ will become zero. Thus the refrigerant flow rate is controlled.

The actuator of the expansion valve 3 may be of the type as disclosed in U.S. patent application Ser. No. 676,320 filed on Nov. 11, 1984.

The super-heat degree may be determined from output signals of two temperature sensors, one of which is provided at the inlet portion or intermediate portion of the evaporator and the other one at the outlet portion of the evaporator.

As described before, the system of this embodiment is configured to generate a negative super-heat signal by using the super-heat correction circuit 10 when the super-heat degree SH derived by the super-heat calculation circuit 9 is zero.

Figure 2:
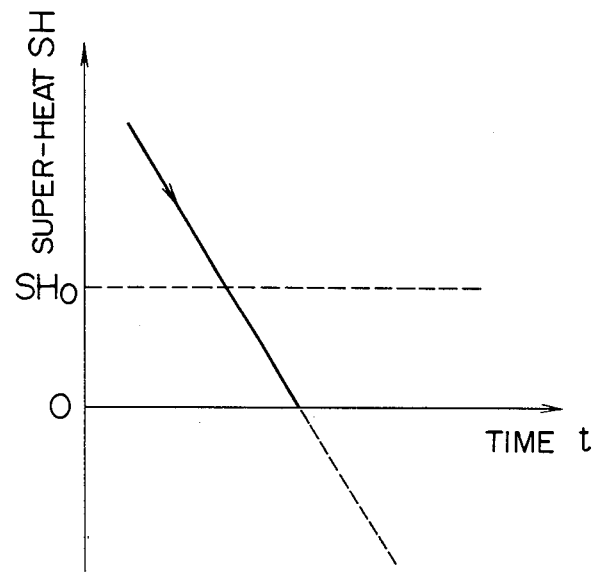
FIGS. 2 and 3 are diagrams illustrating a super-heat signal obtained by the refrigerant flow control device according to the present invention.
Figure 3:
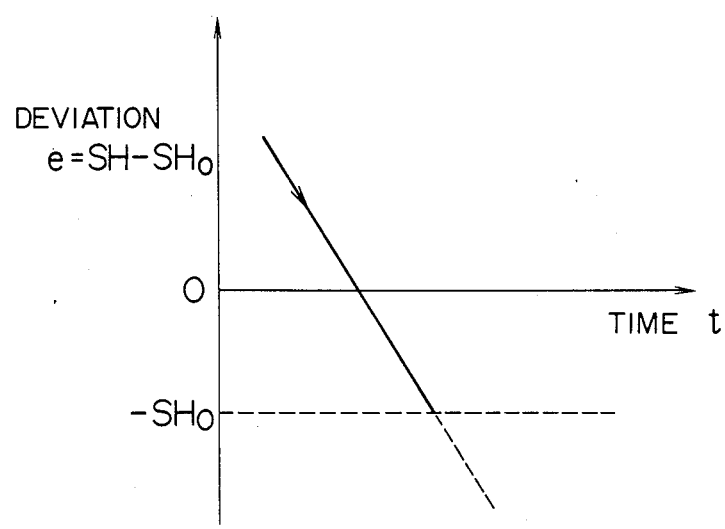

The operation of the refrigerant flow control device 7 thus configured will now be described by referring to FIGS. 2 and 3. FIGS. 2 and 3 are graphs showing the time-variation of the super-heat signal SH and the time-variation of the deviation signal $e = SH - SH_o$.

If the super-heat degree SH as detected has decreased to zero due to decrease in thermal load, the super-heat correction circuit 10 uses a quasi super-heat signal which decreases in proportion to time as shown by a broken line. The differential amplifier 12 calculates the deviation e by using the quasi super-heat signal. On the basis of the deviation e, the opening of the expansion valve 3 is controlled by the control calculation circuit 13 and the valve drive circuit 14. Even if SH has decreased to zero in this control system due to decrease in the thermal load, for example, the negative SH signal which decreases with time is generated. Accordingly, the absolute value of the deviation e increases until the SH value becomes positive. Thus, the opening of the expansion valve 3 is rapidly decreased. As a result, the liquid back state can be avoided.

Another embodiment of the present invention will now be described by referring to FIGS. 4 to 8.

Figure 4:
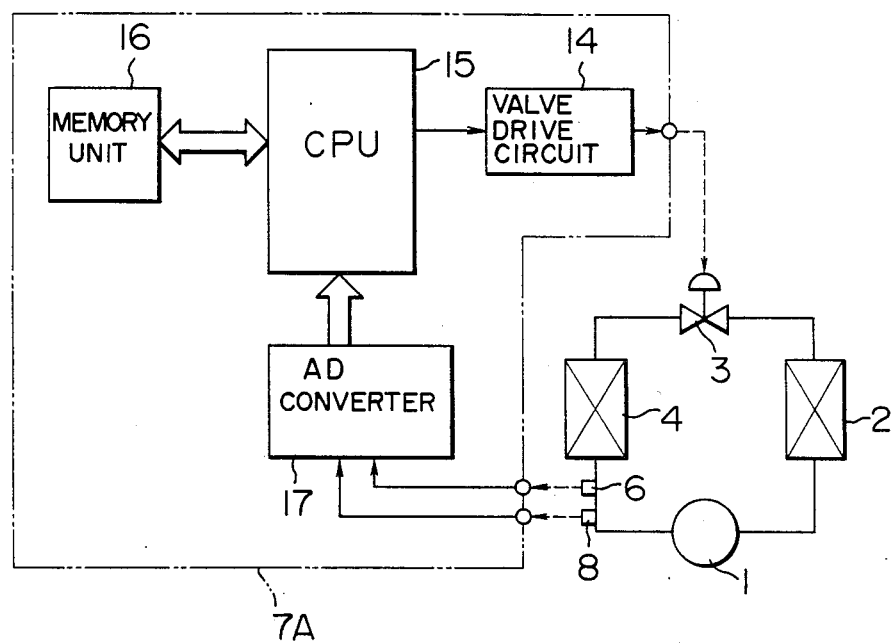
FIG. 4 shows the configuration of a refrigerant flow control device according to another embodiment of the present invention.

In the embodiment of FIG. 4, the super-heat calculation circuit 9, super-heat correction circuit 10, super-heat setting circuit 11, differential amplifier 12, and control calculation circuit 13 of the embodiment illustrated in FIG. 1 are replaced by a microcomputer. A block 7A represented by broken lines denotes a refrigerant flow control device including the microcomputer as the principal element.

The microcomputer is composed of a CPU 15, a memory unit 16, and an AD converter 17.

The temperature signal representing the temperature of the refrigerant at the evaporator outlet sensed by the temperature sensor 6 and the pressure signal representing the pressure of the refrigerant at the evaporator output sensed by the pressure sensor 8 are converted into digital signals, respectively, by the AD converter 17 and the processed by the CPU 15.

On the basis of the temperature signal and the pressure signal, the CPU 15 calculates the super-heat degree in well-known manner in accordance with the programs stored in the memory unit 16, and derives the deviation between the super-heat degree thus calculated and the preset super-heat degree. Further, the CPU 15 determines the opening of the valve required for reducing the deviation to zero. An output of the CPU representing the required opening of the valve, i.e. a valve opening signal is supplied to the valve drive circuit 14 to control the opening of the valve.

In this configuration, the calculation illustrated in FIG. 1 can be effected according to the stored programs without constituting a calculation circuit. Accordingly, the magnitude and change rate of the negative SH signal can be easily adjusted without changing the circuit.

Figure 5:
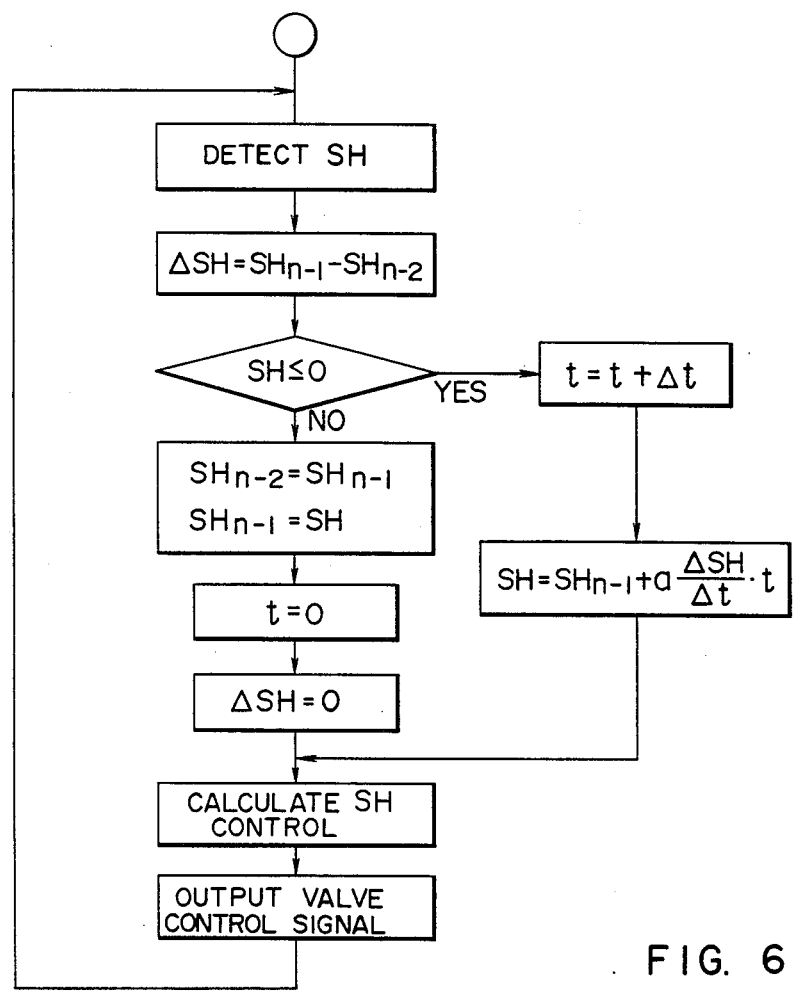
FIGS. 5 to 8 are flow charts indicating the operation of the refrigerant flow control device shown in FIG. 4.
Figure 6:
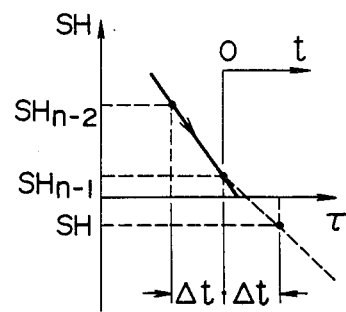

FIGS. 5 and 6 show an example of processing flow when a microcomputer is used.

In the microcomputer, the super-heat degree SH is detected once every sampling interval $\Delta t$. Two previous sample values $SH_{n-2}$ and $SH_{n-1}$ are stored in the memory unit 16. And at every interval, the change of SH represented by $\Delta SH = SH_{n-1} - SH_{n-2}$ is calculated. If $SH > 0$, the memory contents of $SH_{n-2}$ and $SH_{n-1}$ are respectively replaced by $SH_{n-1}$ and SH, and t and $\Delta SH$ are reset to zero. Then, the process of SH calculation and valve control is carried out based on the current value of SH. If $SH \leq 0$, the time interval t lapsed after the last sampling of SH having positive value is obtained by an equation $t = t + \Delta t$. Then, the negative super-heat degree is calculated according to the following equation by using the SH change rate $\Delta SH/\Delta t$ obtained immediately before $SH \leq 0$ is detected:

$$SH = SH_{n-1} + a \frac{\Delta SH}{\Delta t} \cdot t.$$

A coefficient a is experimentally determined to correct the change rate of SH so as to make control stable when $SH \leq 0$.

Figure 7:
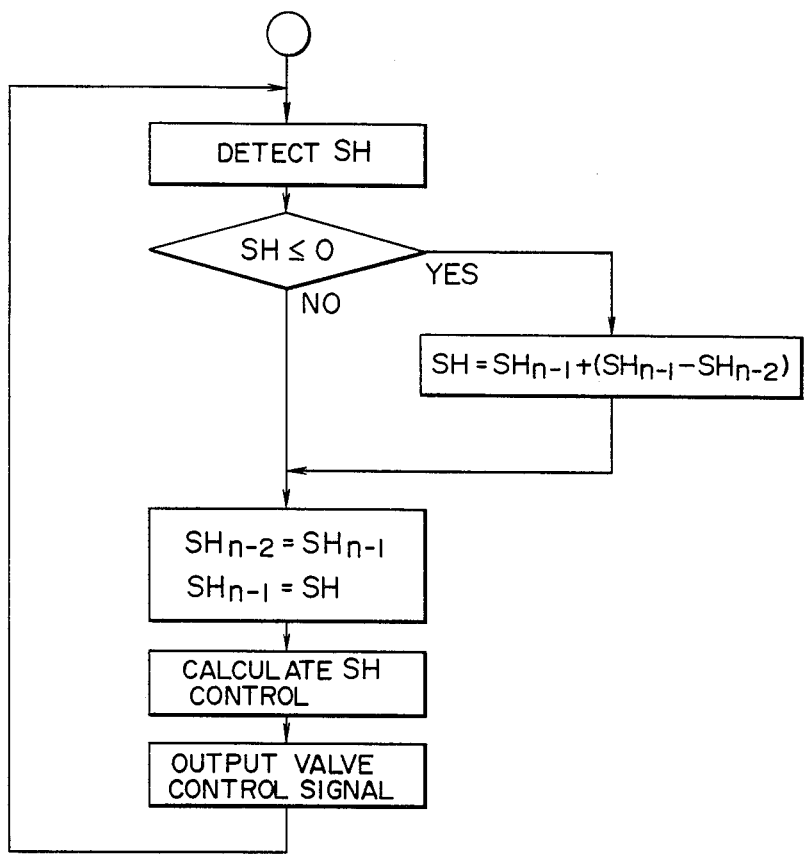
Figure 8:
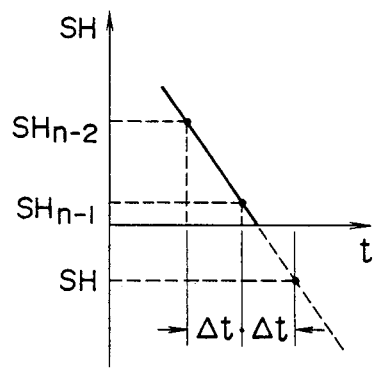
Figure 9:
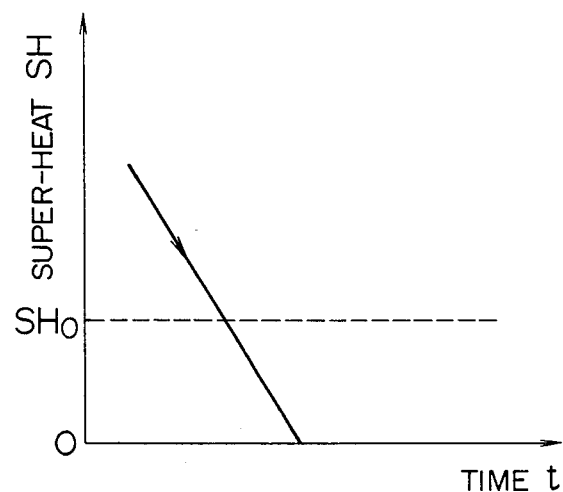
FIGS. 9 and 10 show the control characteristics of the conventional control device.
Figure 10:
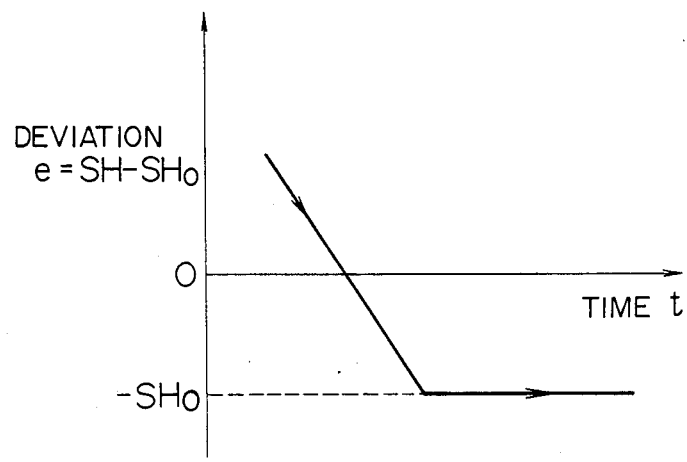

FIGS. 7 and 8 show program when $a=1$, i.e., when the negative SH is changed with the change rate immediately before $SH \leq 0$. In this case, it is not required to calculate $\Delta SH$ and t. Accordingly, the processing for clearing these values can be eliminated. Further, the calculation of $\Delta SH/\Delta t$ can also be eliminated, resulting in simpler program.

We claim:

1. A refrigerant flow control device for used with a refrigerator cycle comprising a compressor, a condenser for condensing refrigerant, an evaporator for evaporating the refrigerant and an expansion valve, the opening of which can be electrically adjusted for controlling the flow rate of the refrigerant, said control device comprising:

means for detecting the super-heat degree of the refrigerant at an outlet of the evaporator;
    a control circuit for producing a control signal representing a difference between said detected super-heat degree and a preset super-heat degree, and including means for correcting said detected super-heat degree before producing said control signal, when said detected super-heat degree is zero, to a corrected super-heat degree having a negative value, so that said control signal represents a difference between the negative super-heat degree and the preset super-heat degree; and
    valve driving means connected to receive said control signal for controlling the opening of said expansion valve so as to maintain the super-heat degree of the refrigerant at the outlet of said evaporator at said preset super-heat degree.

2. A refrigerant flow control device according to claim 1, wherein said corrected super-heat degree takes a negative value whose absolute value increases in proportion to the lapse of time.

3. A refrigerant flow control device according to claim 1, wherein said corrected super-heat degree takes a negative value which changes at the same rate as a rate in change of said detected super-heat degree as detected immediately before said detected super-heat degree has reached zero.

4. A method for controlling a flow of a refrigerant in a refrigerator cycle comprising a compressor, a condenser for condensing the refrigerant, an evaporator for evaporating the refrigerant and an expansion valve, the opening of which is electrically adjustable for controlling the flow rate of the refrigerant, said method comprising the steps of:

detecting periodically a super-heat degree of the refrigerant at an outlet of the evaporator;
    producing a control signal representing a difference between the detected super-heat degree and a preset super-heat degree,
    correcting said detected super-heat degree before producing said control signal, when said detected super-heat degree is zero, to a corrected super-heat degree having a negative value, and
    controlling the opening of the expansion valve according to said control signal thereby adjusting the flow rate of the refrigerant so as to maintain the super-heat degree of the refrigerant at the outlet of the evaporator at said preset super-heat degree.

5. A method for controlling a flow of a refrigerant according to claim 4, wherein said corrected super-heat degree takes a negative value whose absolute value increases in proportion to the lapse of time.

6. A method for controlling a flow of a refrigerant according to claim 4, wherein said corrected super-heat degree takes a negative value which changes at the same rate as a rate in change of said detected super-heat degree as detected immediately before said detected super-heat degree has reached zero.

* * * * *